(12) United States Patent
Frazier, Jr. et al.

(10) Patent No.: US 8,146,545 B2
(45) Date of Patent: Apr. 3, 2012

(54) FILTER FOR A CRANKCASE VENTILATION SYSTEM

(75) Inventors: Ronald G. Frazier, Jr., Oxford, MS (US); David Tice, Michigan City, MS (US)

(73) Assignee: Parker-Hannifin Corporation, Cleveland, OH (US)

( * ) Notice: Subject to any disclaimer, the term of this patent is extended or adjusted under 35 U.S.C. 154(b) by 524 days.

(21) Appl. No.: 12/388,538

(22) Filed: Feb. 19, 2009

(65) Prior Publication Data

US 2009/0211544 A1   Aug. 27, 2009

Related U.S. Application Data

(60) Provisional application No. 61/031,190, filed on Feb. 25, 2008.

(51) Int. Cl.
*F01M 13/00* (2006.01)
*F01M 11/03* (2006.01)
*F02B 25/06* (2006.01)
*B01D 27/10* (2006.01)
*B01D 35/14* (2006.01)
*B01D 41/00* (2006.01)

(52) U.S. Cl. .............. 123/41.86; 123/196 A; 123/572; 210/130

(58) Field of Classification Search ............. 123/41.86, 123/196 A, 572–574; 210/130
See application file for complete search history.

(56) References Cited

U.S. PATENT DOCUMENTS

| 3,049,240 | A | 8/1962 | Smith |
| 3,912,240 | A | 10/1975 | Smith et al. |
| 4,243,535 | A | 1/1981 | Behrends et al. |
| 5,450,835 | A | 9/1995 | Wagner |
| 5,803,025 | A | 9/1998 | Feucht |
| 6,247,463 | B1 | 6/2001 | Fedorowicz et al. |
| 6,557,536 | B2 | 5/2003 | Burgess |
| 6,647,973 | B1 | 11/2003 | Schueler et al. |
| 6,652,614 | B2 * | 11/2003 | Gieseke et al. ............. 55/498 |
| 6,691,687 | B1 | 2/2004 | Liang et al. |

(Continued)

FOREIGN PATENT DOCUMENTS

WO   2004067925   8/2004

(Continued)

OTHER PUBLICATIONS

GB0903230.1; Search Report dated May 28, 2009.

*Primary Examiner* — Marguerite McMahon
*Assistant Examiner* — Tea Bajramovic
(74) *Attorney, Agent, or Firm* — Renner, Otto, Boisselle & Sklar, LLP

(57) ABSTRACT

An oil-collecting can (500) for a filter cartridge (300) comprises a plurality of capillary ribs (530) that are sized and shaped to contact filter media in the outlet chamber. The oil-collecting can (500) can be used in conjunction with a filter cartridge (300), which is installed in a filter assembly to encourage the downward flow of oil droplets. Such a filter assembly could be used, for example, in a crankcase ventilation system, to remove particulates and other contaminants from piston-bypass fumes.

20 Claims, 15 Drawing Sheets

U.S. PATENT DOCUMENTS

| | | | |
|---|---|---|---|
| 7,153,422 B2 * | 12/2006 | Herman et al. | 210/206 |
| 7,159,386 B2 | 1/2007 | Opris | |
| 7,185,643 B2 | 3/2007 | Gronberg et al. | |
| 7,232,521 B2 * | 6/2007 | Merritt et al. | 210/206 |
| 7,363,917 B2 * | 4/2008 | Kramer et al. | 123/511 |
| 7,406,960 B2 * | 8/2008 | Knauf et al. | 123/572 |
| 7,497,340 B2 * | 3/2009 | Hershberger et al. | 210/435 |
| 2007/0095741 A1 | 5/2007 | Berends | |
| 2007/0186893 A1 | 8/2007 | Venhaus et al. | |
| 2009/0050121 A1 * | 2/2009 | Holzmann et al. | 123/573 |
| 2010/0031940 A1 * | 2/2010 | Mosset et al. | 123/573 |

FOREIGN PATENT DOCUMENTS

| | | |
|---|---|---|
| WO | 2007129137 | 11/2007 |

* cited by examiner

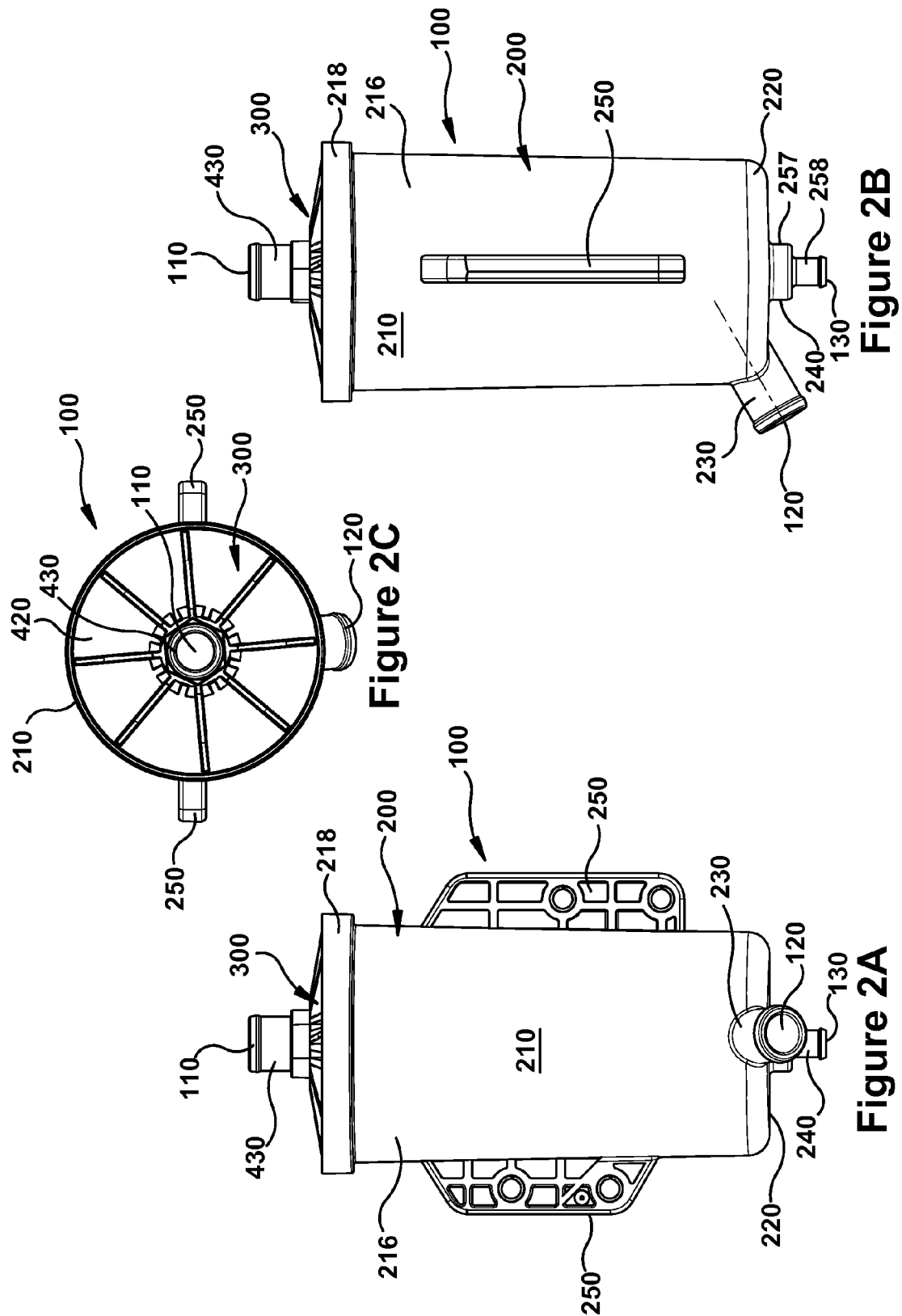

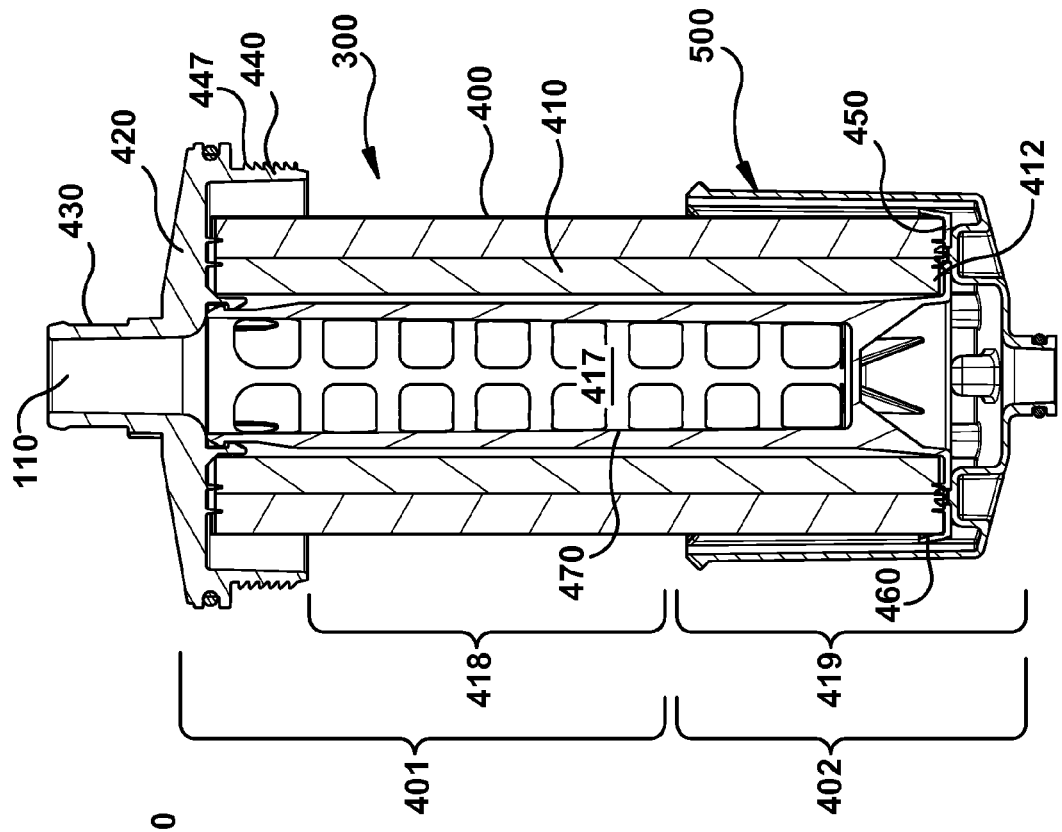
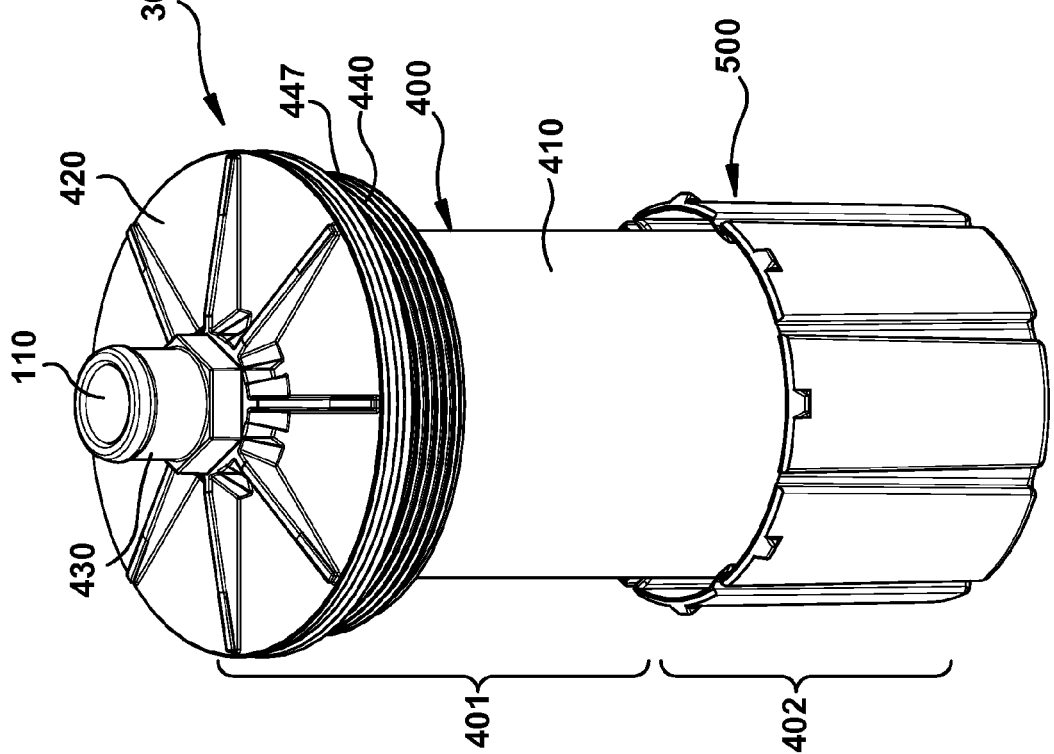

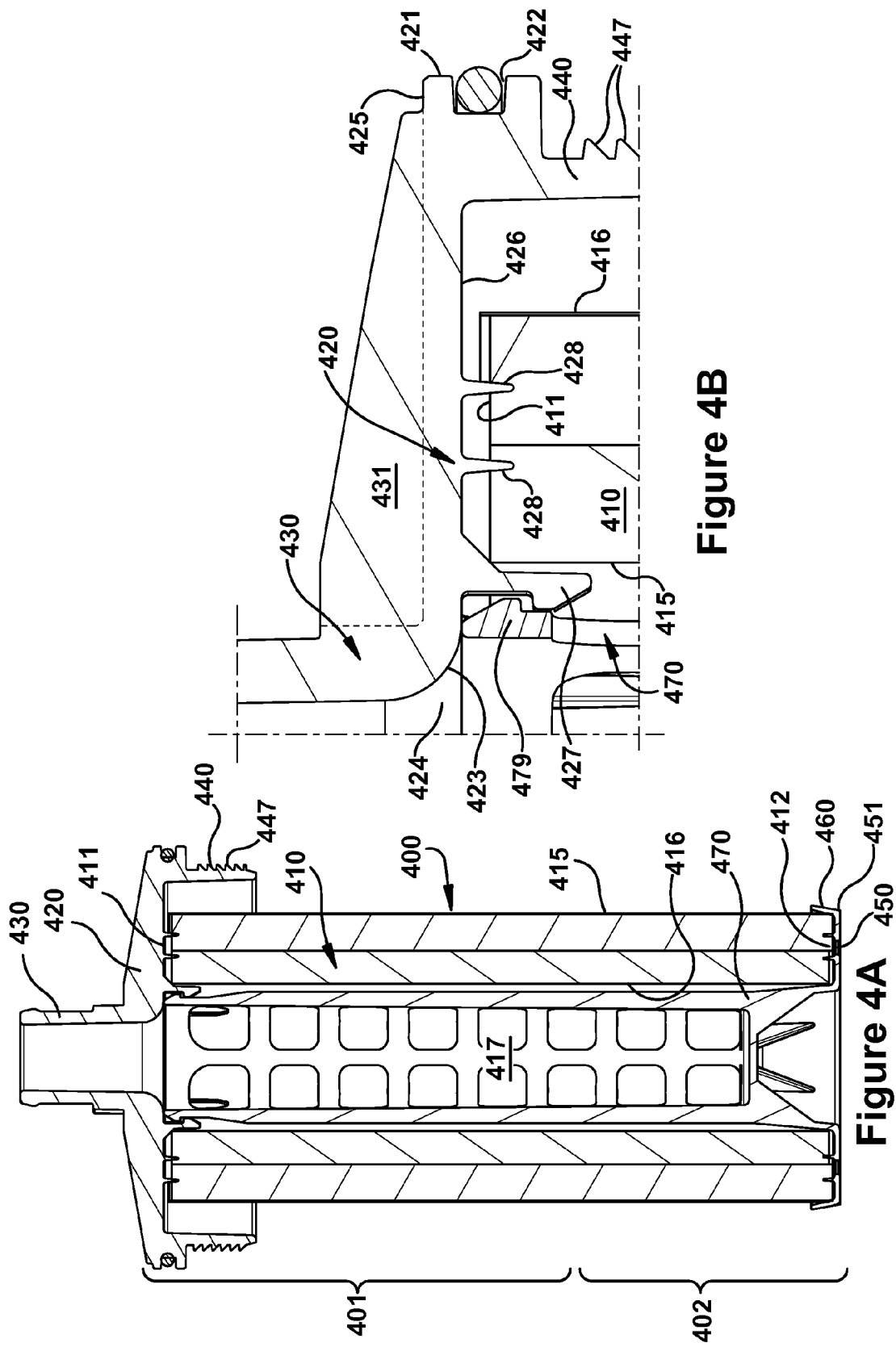

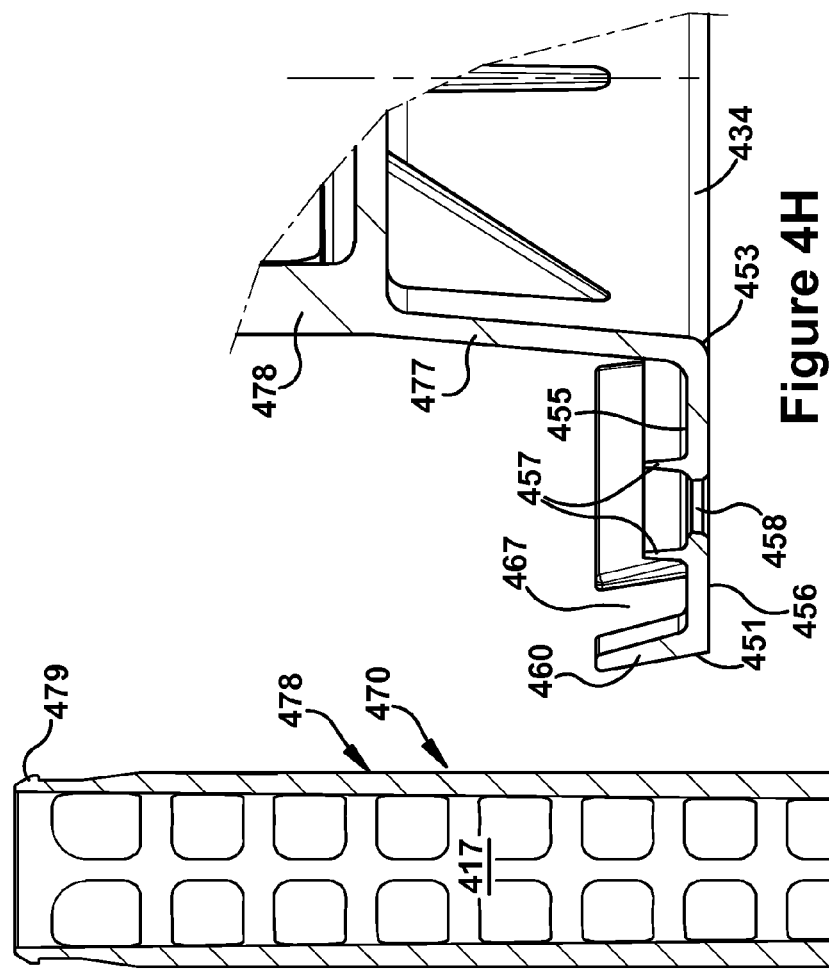
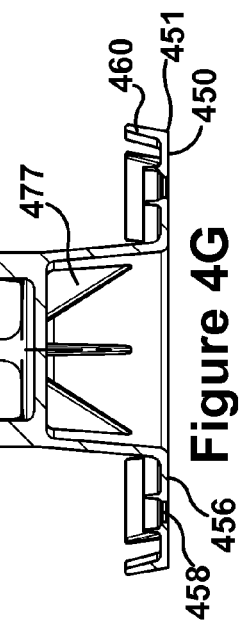
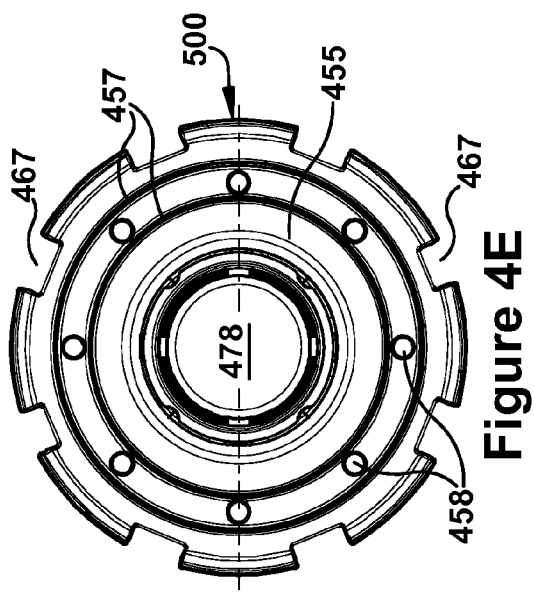
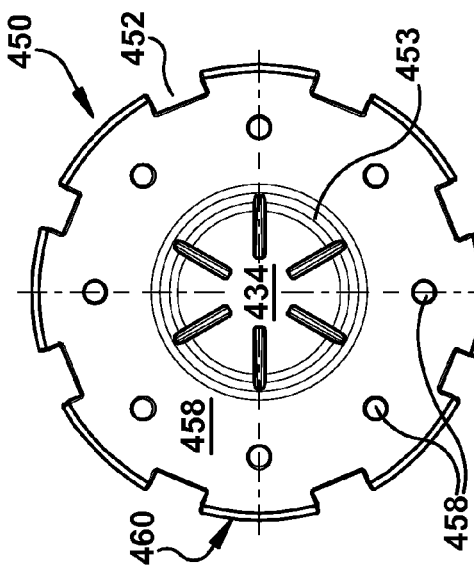

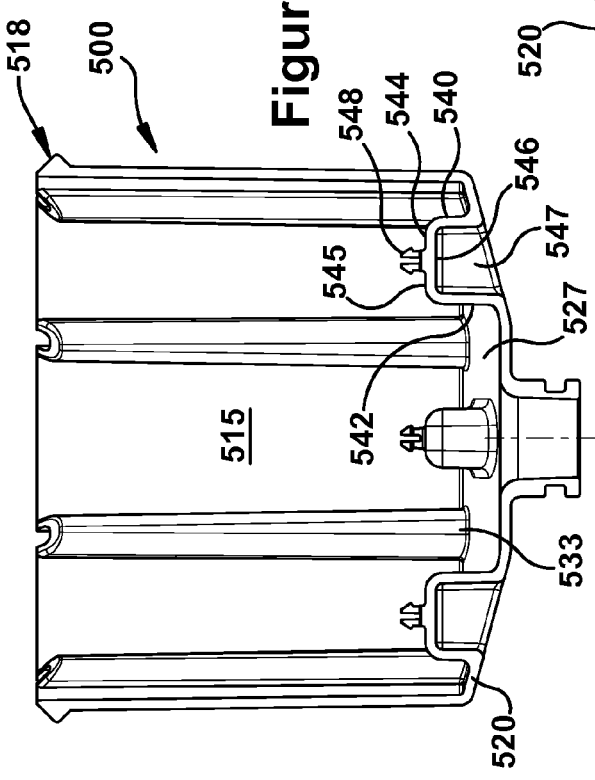
Figure 5E
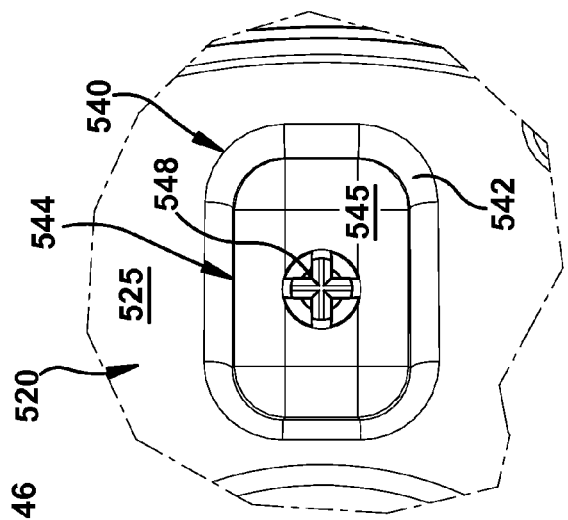
Figure 5H
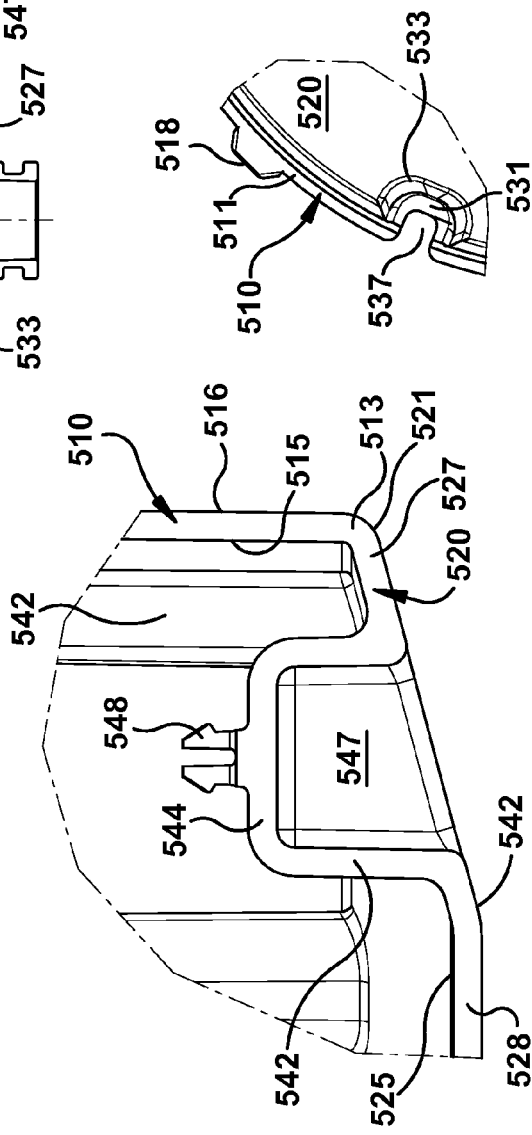
Figure 5G
Figure 5F

US 8,146,545 B2

FILTER FOR A CRANKCASE VENTILATION SYSTEM

RELATED APPLICATION

This application claims priority under 35 U.S.C. §119 (e) to U.S. Provisional Patent Application No. 61/031,190 filed on Feb. 25, 2008. The entire disclosure of this provisional application is hereby incorporated by reference. If incorporated-by-reference subject matter is inconsistent with subject matter expressly set forth in the written specification (and/or drawings) of the present disclosure, the latter governs to the extent necessary to eliminate indefiniteness and/or clarity-lacking issues.

FIELD

A crankcase ventilation system including a filter assembly which removes particulates and other contaminants from crankcase fumes.

BACKGROUND

An internal combustion engine (e.g., a diesel engine), can be provided with a ventilation system for venting the fumes that leak past the piston rings and through the circulating oil in the crankcase. The crankcase fumes (i.e., a mixture of air, exhaust, and oil) are commonly passed through a filter assembly. Such a filter assembly can include, for example, an inlet chamber, an outlet chamber, and a filtering media (through which the crankcase fumes must pass to flow from the inlet chamber to the outlet chamber) that removes particulates and other contaminants. Oil will typically migrate through the media with the gas, and oil droplets will form on the filter surface within the outlet chamber. Gravity causes the oil droplets to slide downward and a bottom receptacle can be positioned for collection thereof.

SUMMARY

An oil-collecting can is provided for the filter assembly in a crankcase ventilation system that has capillary ribs to encourage oil droplets to drain downward. The ribs are adapted to contact the filter surface within the outlet chamber to provide a less resistant path than the filter media. When the oil droplets reach the contacting rib region, they will prefer to follow its smooth slide and thereby be quickly transported to the bottom of the can.

DRAWINGS

FIGS. 2A-2G are various views of the filter assembly 100 of the crankcase ventilation system.

FIGS. 3A-3E are various views of the filter cartridge 300 of the filter assembly 100.

FIGS. 4A-4H are various views of the filter element 400 of the filter cartridge 300.

FIGS. 5A-5J are various views of the oil-collecting can 500 of the filter cartridge 300.

DESCRIPTION

Figure 1A:
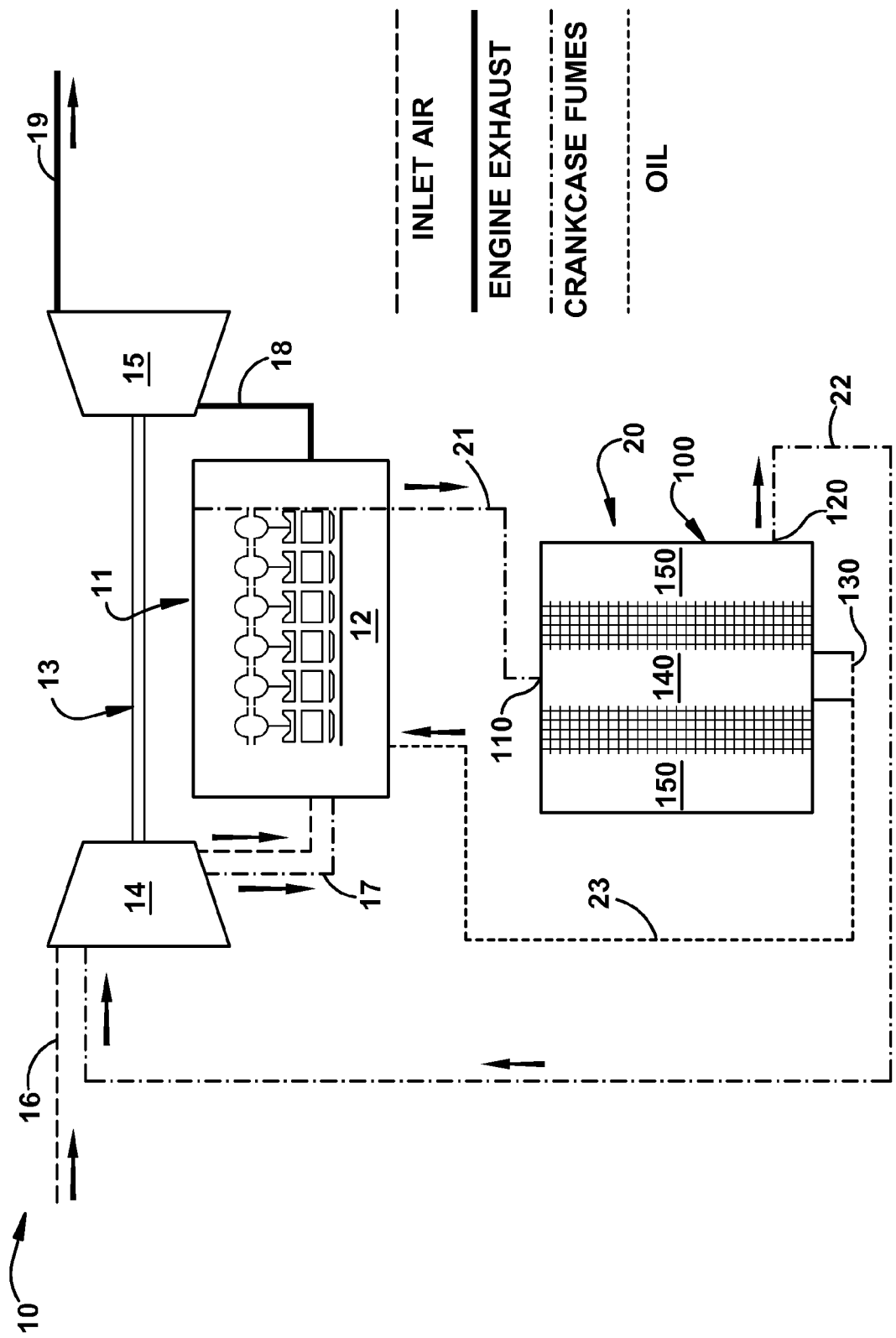
FIGS. 1A-1D are each a schematic diagram of an engine that incorporates a crankcase ventilation system.

Referring now to the drawings, and initially to FIG. 1A, an engine 10 is schematically shown. The engine 10 includes a crankcase 11 (having an oil pan 12), and a turbocharger 13 (comprising compressor 14 and turbine 15). An air-inlet line 16 supplies air to the compressor 14, and an air-intake line 17 supplies the compressed air to the intake of the crankcase 11. On the exhaust side of the engine 10, an outtake line 18 supplies exhaust to the turbine 15, and the turbine 15 discharges to an exhaust line 19.

Figure 1B:
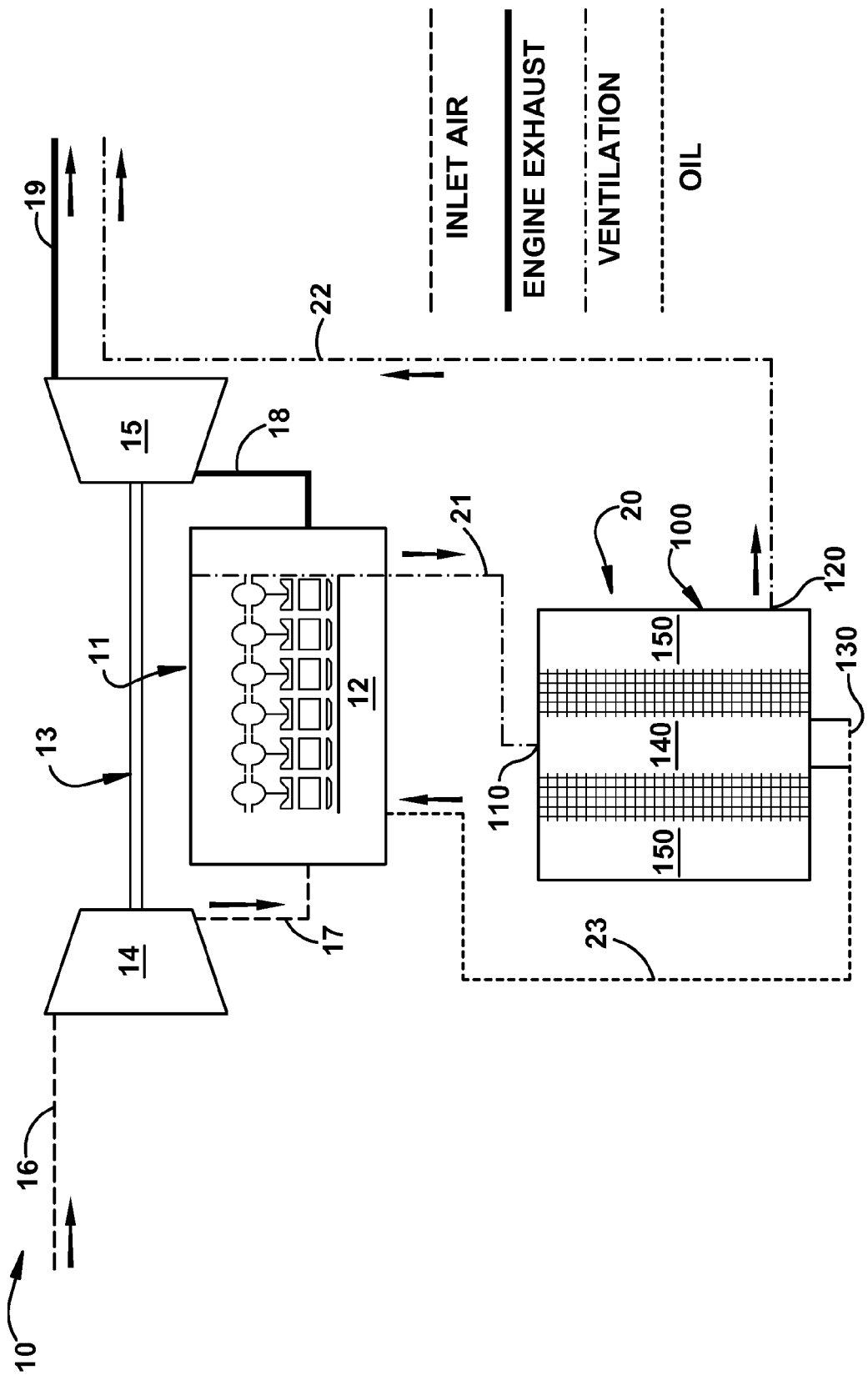
Figure 1C:
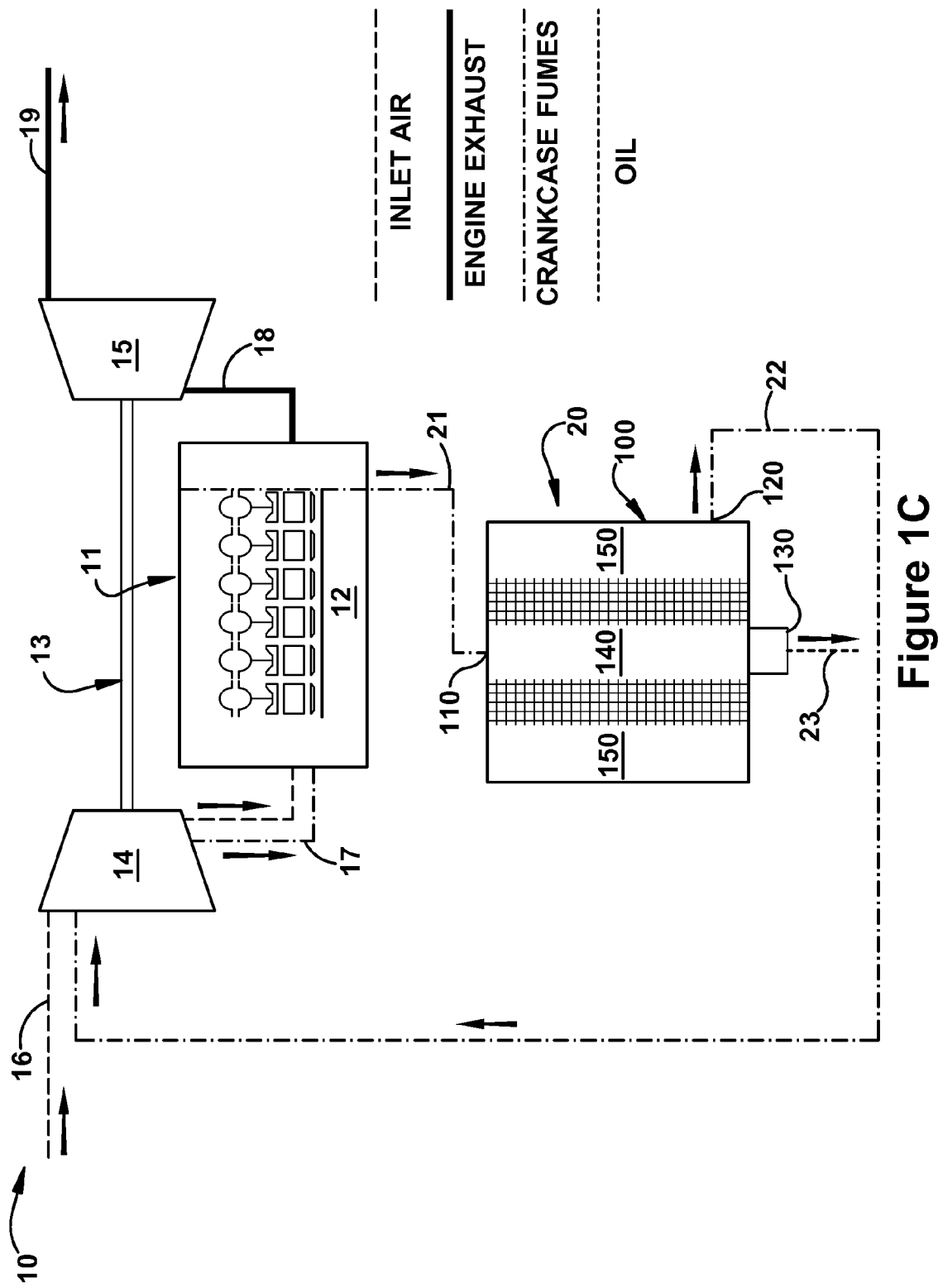
Figure 1D:
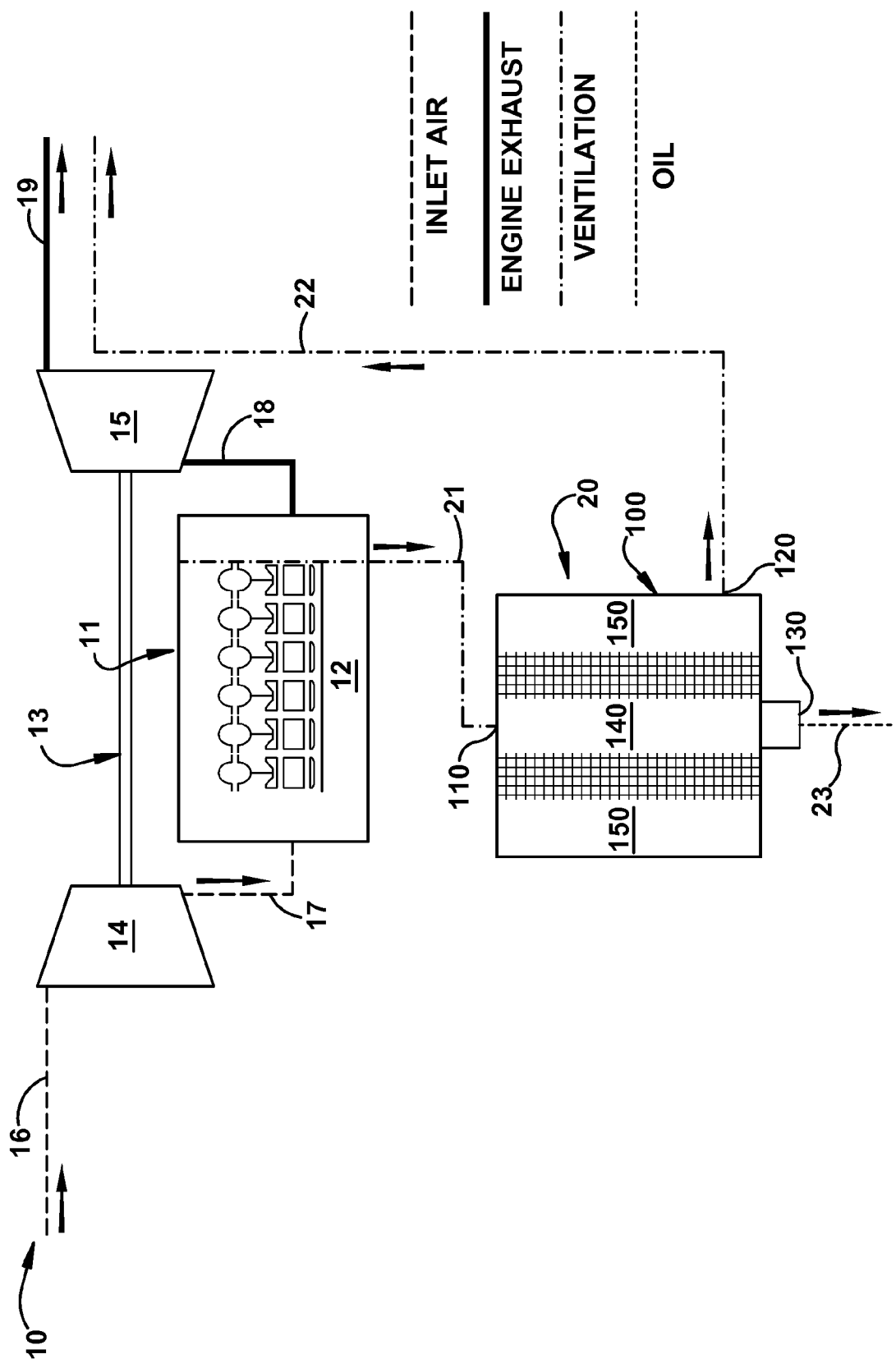

The engine 10 incorporates a crankcase ventilation system 20 for venting fumes from within the crankcase 11. The illustrated system 20 has an engine vent line 21, a gas exit line 22, and an oil exit line 23. The system 20 comprises a filter assembly 100 that receives crankcase-ventilation fumes through the engine vent line 21, filters the gases and exits it through the line 22, and removes the oil for exit through line 23. The gas-exit line 22 can join air-intake line 16 for passage back through the crankcase 11, and the oil-exit line 23 can return oil to the pan 12. Alternatively, the gas-exit line 22 can join the exhaust line 19 (FIGS. 1B and 1D) and/or the oil-exit line 23 can be drained (FIGS. 1C and 1D).

Figure 2E:
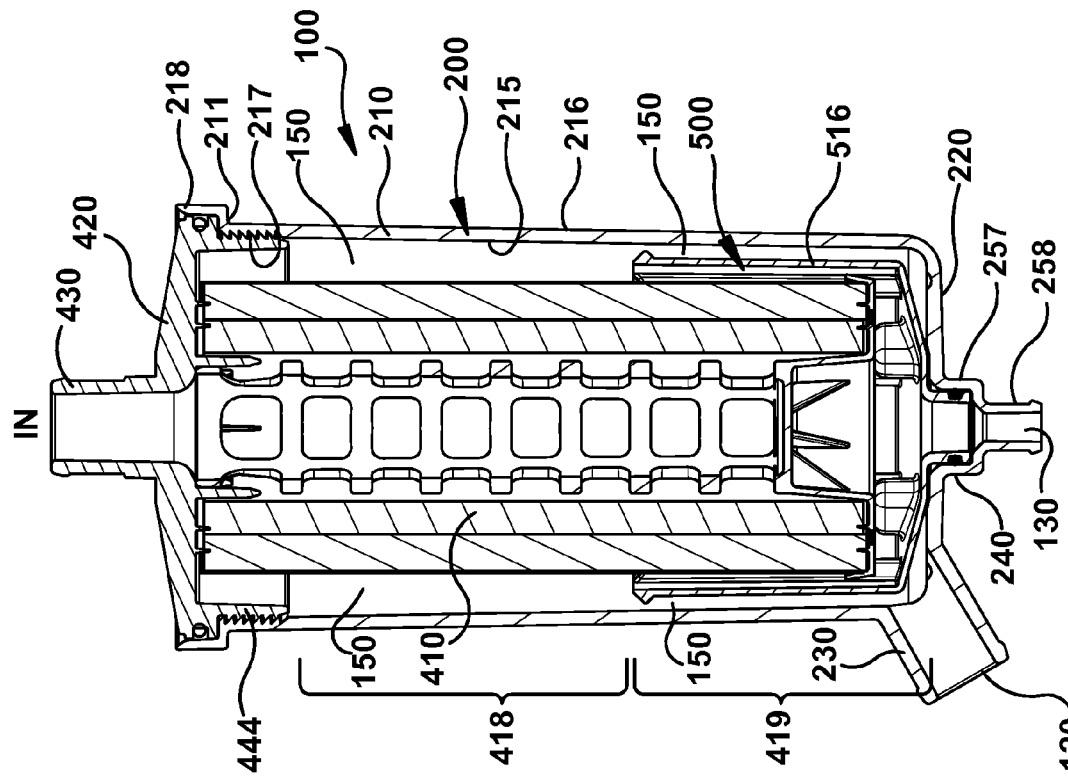

The filter assembly 100 comprises an inlet port 110 (See FIGS. 2C and 1D) connected to the vent line 21, a gas outlet port 120 connected to the gas exit line 22, and an oil outlet port 130 connected to the oil exit line 23. The inlet port 110 communicates with an inlet chamber 140 and the outlet ports 120/130 communicate with an outlet chamber 150. As is explained in more detail below, the fumes must pass through a filtering media (e.g., filtering media 410, introduced below), to flow from the inlet chamber 140 to the outlet chamber 150.

The filter assembly 100, shown more pictorially in the $2^{nd}$ drawing set (FIGS. 2A-2G), can comprise a housing 200 and a filter cartridge 300. The housing 200 can comprise a side wall 210, a bottom wall 220, an outlet tube 230, and an oil spout 240. The wall 210, the wall 220, the tube 230, and the spout 240 can be formed in one piece (e.g., molded from a polymeric material).

The side wall 210 has an upper edge 211 (defining the housing's open top 212), a lower edge 213, an interior surface 215, and an exterior surface 216. Interior threads 217 (i.e., on the interior surface 215) are situated along the wall's upper edge 211, for mating with complementary threads (namely threads 447 introduced below) on the filter cartridge 300. The cylindrical wall 210 can further comprise a rim 218 extending axially upward and radially outward from its upper edge 211.

Figure 2D:
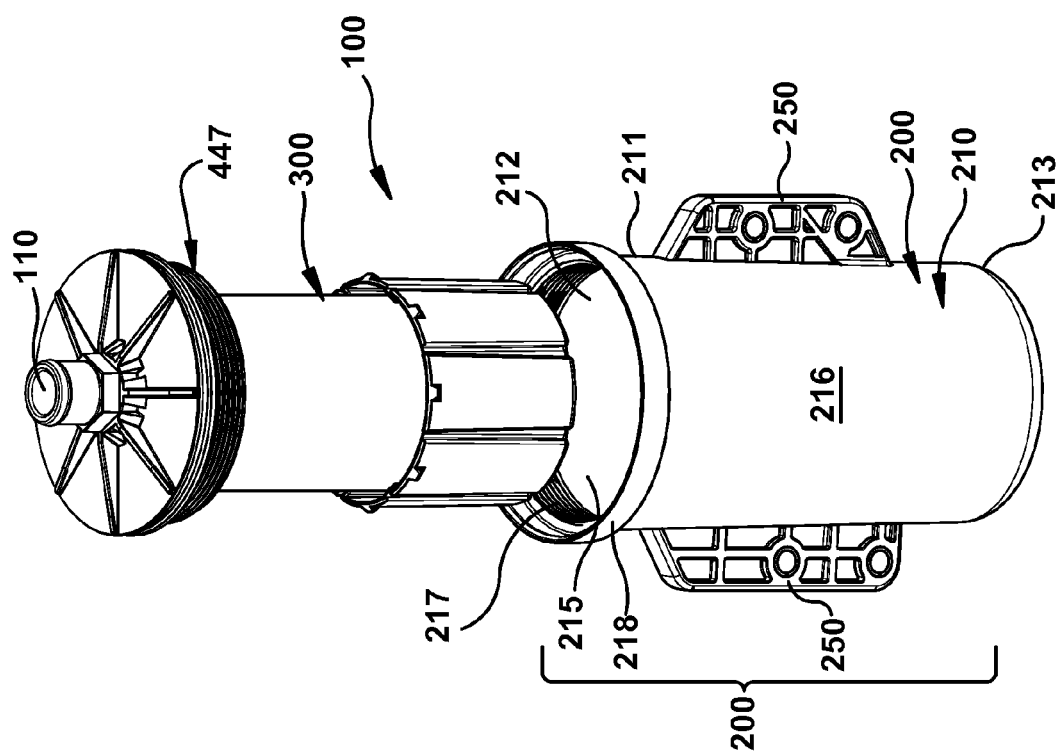
Figure 2G:
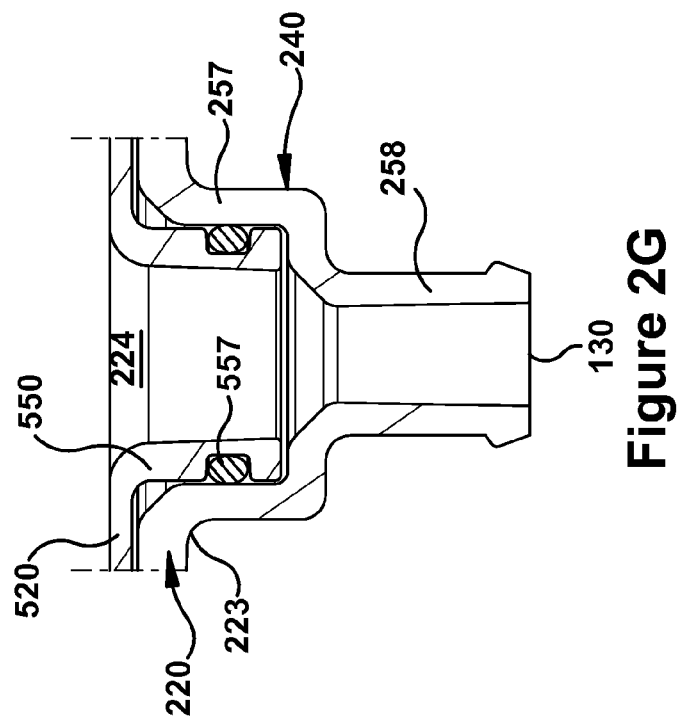
Figure 2F:
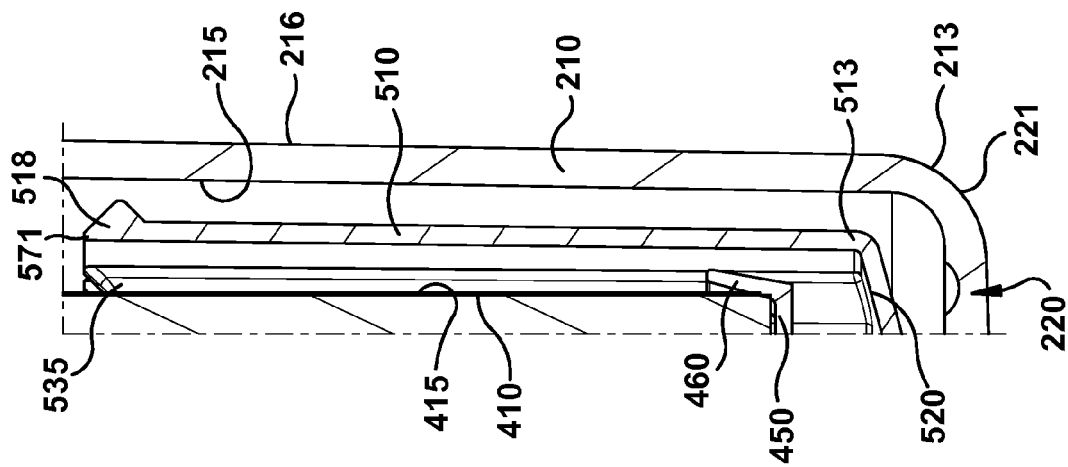

The bottom wall 220 comprises a radially outer edge 221 transitioning into the lower edge 213 of the side wall, and a radially inner edge 223 defining a central opening 224 (See FIGS. 2F and 2G). The side wall 210 has a substantially cylindrical shape and the bottom wall 220 has a substantially annular shape, these shapes being interrupted by a corner opening from which the outlet tube 230 radially (with a downward slope) extends. The oil spout 240 extends downward from the opening 224 in the bottom wall 220, and includes upper wide portion 257 and a lower narrow portion 258 (See FIG. 2G). The tube 230 forms the gas outlet port 120 and the spout 240 forms the oil outlet port 130.

Referring now to FIG. 2D, the housing 200 can further comprise mounting flanges 250 extending, for example, radially from the exterior surface 216 of its cylindrical wall 210. The location, size and shape of such mounting means will depend upon the intended application of filter assembly 100. These flanges 250 can (or cannot) be formed in one piece with the cylindrical wall 210 and/or the rest of the housing 200.

The filter cartridge 300, shown alone in the $3^{rd}$ drawing set, comprises a filter element 400 and an oil-connecting can 500. The cartridge 300 is intended for periodic replacement in the filter assembly 100 (as opposed to the housing 200). The cartridge 300 is preferably pre-assembled by the manufacturer, with the filter element 400 already (and essentially non-removably) secured to the can 500. But a cartridge 300 that is instead assembled by the user (i.e., the filter element 400 and the can 500 are provided separately by the manufacturer) is possible and contemplated.

Figure 3D:
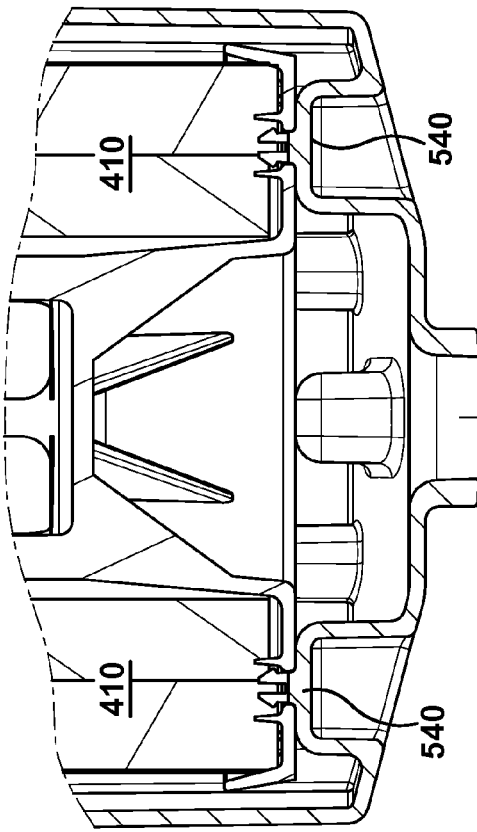

The filter element 400 is shown disassembled from the oil-collecting can 500 in the 4th drawing set. As is best seen by referring briefly back to FIG. 3B, the filter media 410 can be viewed as having an upper portion 401, which is not surrounded by the oil-collecting can 500, and a lower portion 402, that is surrounded by the oil-collecting can 500. In the filter assembly 100, the outlet chamber 150 (See 2E) is the space between the upper portion 418 and the housing's interior surface 215, and the space between the lower portion 419 and the can 500 (and more particularly its exterior surface 516, introduced below).

Figure 4D:
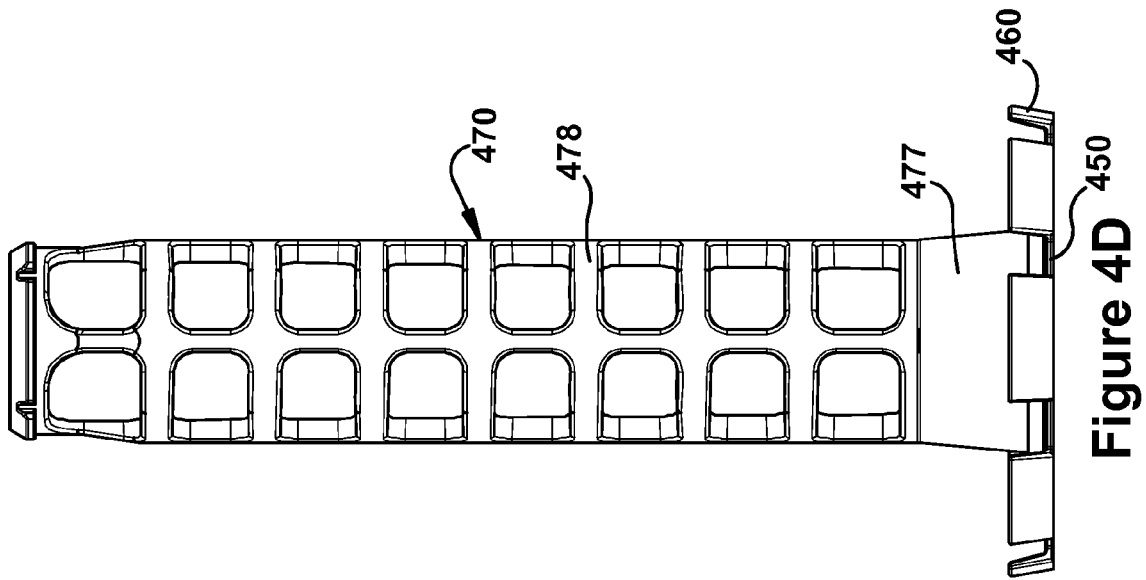

Referring now to FIG. 4A, the filter element 400 comprises a filtering media 410 compiled into a cylindrical pack having an upper face 411, a lower face 412, an exterior surface 415, and interior surface 416 defining a central bore 417. The illustrated filter element 400 comprises two concentric layers of filtering material, but more (e.g., three, four, etc.) or less (e.g., one) layers of filtering material are possible and contemplated. In any event, the filtering material (e.g., paper) will usually be fibrous and/or rough.

The illustrated filter element 400 also comprises a top end cap 420, an inlet tube 430, a housing-connecting rim 440, a bottom end cap 450, a can-engaging rim 460, and a center tube 470. The top end cap 420, the tube 430, and rim 440 can be formed in one piece (e.g., molded from a polymeric material). Additionally or alternatively, the bottom end cap 450, the can-engaging rim 460, and the center tube 470 can be formed in one piece (e.g., molded from a polymeric material).

Referring now to FIG. 4B, the top end cap 420 comprises a radially outer edge 421 (with a seal-receiving groove 422), a radially inner edge 423 defining an opening 424, a top surface 425, and a bottom surface 426 sealing the media's upper face 411. The illustrated end cap 420 has an annular latch 427 and circular ledges 428 extending downward from its bottom surface 426. The latch 427 engages with similar component on the center tube 470 (namely latch 479 introduced below), and the ledges 428 pierce into the media's upper face 411.

The inlet tube 430 extends upward from the cap's top surface 425, communicating with the opening 424. The house-connecting rim 440 extends downward from the cap's bottom surface 426 and has threads 447 formed on its exterior surface. In the filter assembly 100, a seal (e.g., an o-ring) is seated in the groove 422 to seal the interface between the cap's radially outer edge 421 and the housing's interior surface 215. The inlet tube 430 forms the inlet port 110 and it communicates with the central bore 417 of the filter media 410 (See FIG. 3B). The threads 447 on the filter rim 440 are threadably engaged with the threads 217 on the housing rim 218 to assemble the filter cartridge 300 to the housing 200.

Figure 4C:
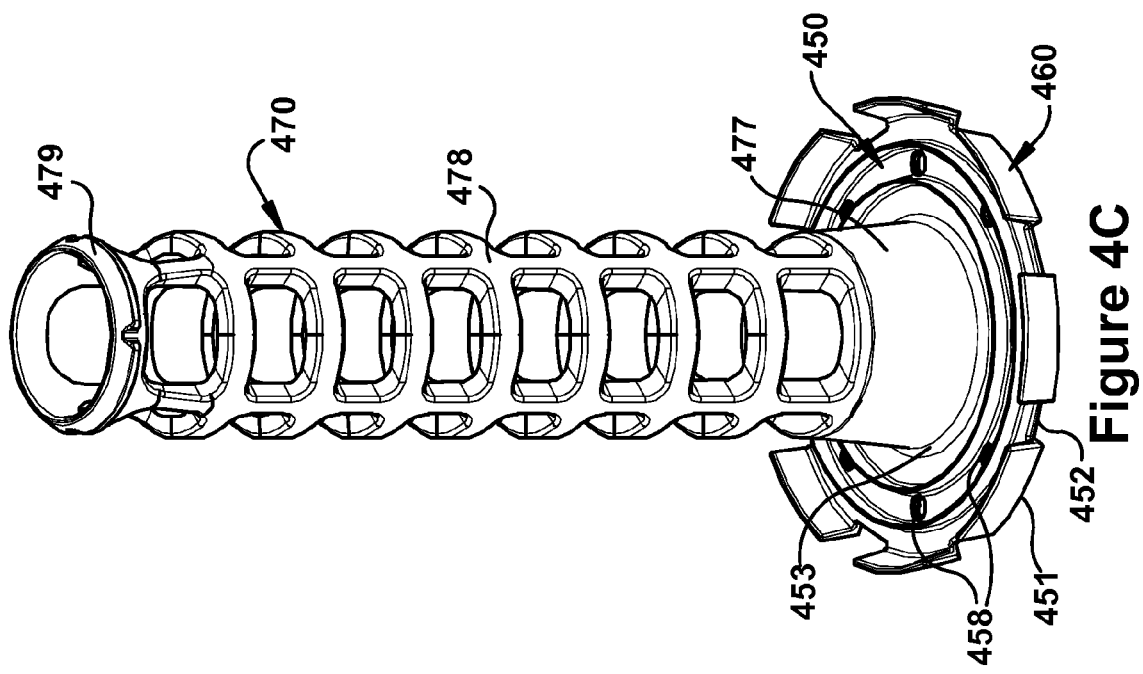

The bottom end cap 450 comprises a radially outer edge 451 with slots 452 (See FIG. 4C), a radially inner edge 453 defining an opening 434 (See FIG. 4F), a top surface 455, and bottom surface 456 (See FIG. 4H). Annular ledges 457 extend upward from the cap's top surface 455 and pierce the media's lower face 412. A series of holes 458 extend axially through the end cap 450 for receipt of clipping components (namely clips 548 introduced below) in the oil-collecting can 500. The rim 460 extends upwardly from the cap's outer edge 451 and includes slots 452 coextensive with the can's slots 467 (See 4E and 4F). In the filter cartridge 300, the slots 452/467 align with rib components (namely capillary ribs 530 introduced below) in the oil-collecting can 500.

Referring now to FIG. 4G, the center tube 470 comprises an upside-down cup 477 and a perforated sleeve 478 that occupy the central bore 417 of the filter media 410. The cup 477 extends upward from and seals the opening 434 in the bottom end cap 450, and a perforated sleeve 478 extend upward from the cup 477. The sleeve 478 has a cap-engaging latch 479 that cooperates with the tube-engaging latch 427 of the top end cap 420. In the filter assembly 100, the inlet chamber 140 is formed by the space above the cup 477 in the central bore 417.

The oil-collecting can 500 is shown disassembled from the filter element 400 in the 5th drawing set (i.e., FIGS. 5A-5J.) The can 500 generally comprises a cylindrical side wall 510, a bottom wall 520, a plurality of capillary ribs 530, a set of pedestals 540 (See FIG. 5C), and an oil-outlet pipe 550. These parts are preferably made in one piece (e.g., molded from a polymeric material).

Figure 5C:
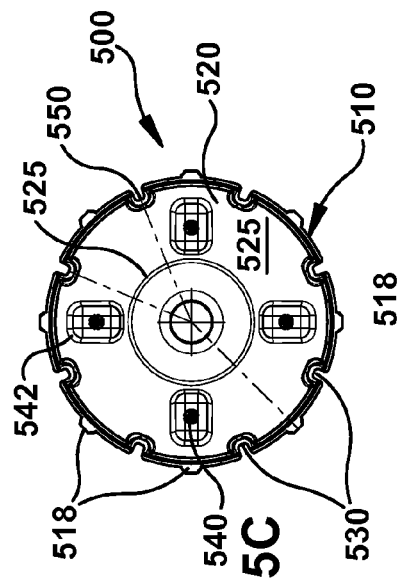
Figure 5B:
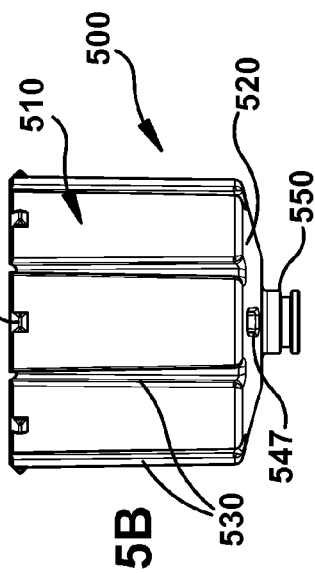
Figure 5D:
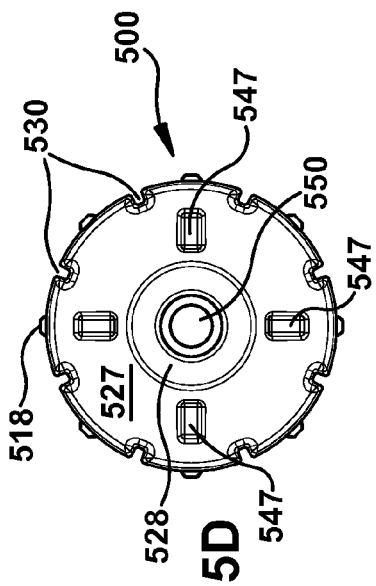
Figure 5A:
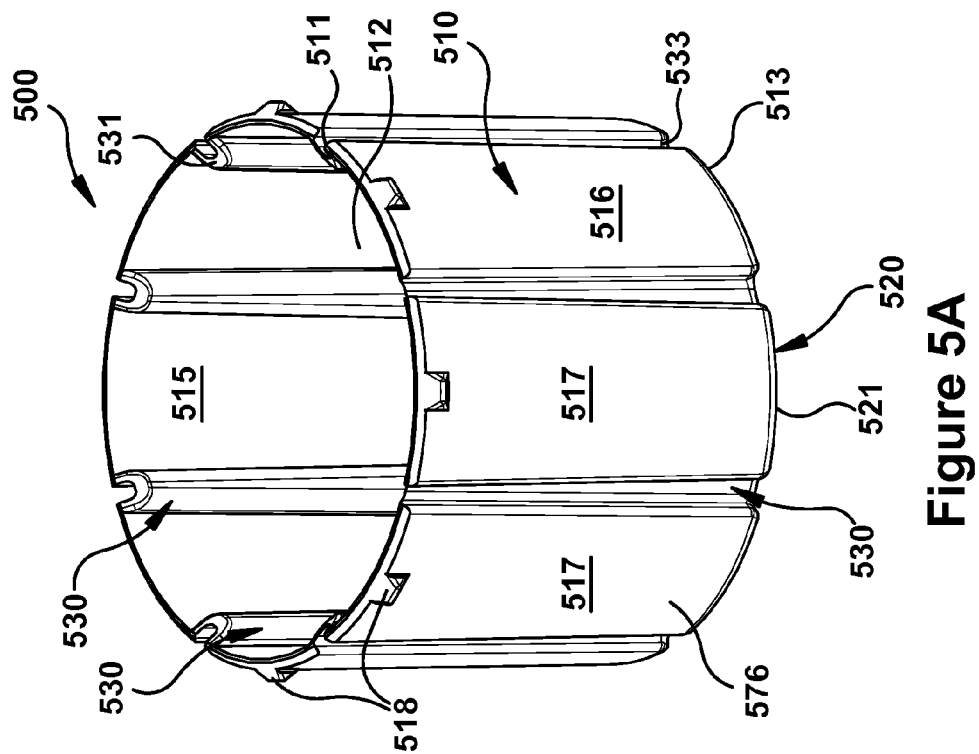

Referring now to FIG. 5A, the cylindrical side wall 510 has an upper axial edge 511 defining an open top end 512, a lower axial edge 513, an interior surface 515, and an exterior surface 516. The cylindrical side wall 510 can be viewed as comprising wall panels 517 separated by the capillary ribs 530. Each panel 517 (and/or at least one panel 517, or at least some of the panels 517) can include a nub 518 projecting radially outward from its upper edge 511. The nub shape can be trapezoidal in plan (FIG. 5G) and triangular in section (FIG. 5E). In the filter assembly 100, the nubs 518 radially situate (e.g., center) the filter cartridge 300 within the cylindrical wall 210 of the housing 200.

Figure 5J:
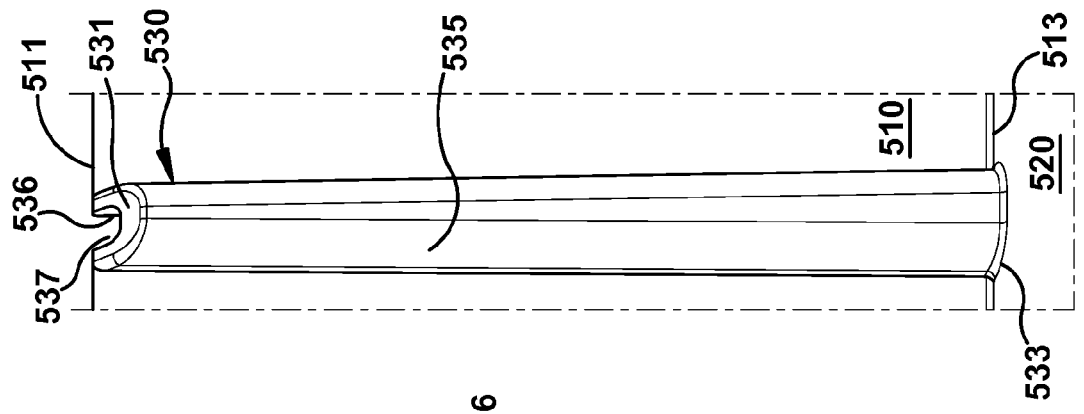

Referring now to FIG. 5F, the bottom wall 520 has a radially-outer edge 521 that transitions from the lower edge 513 of the side wall 510, a radially-inner edge 523 (See 5I) that defines an opening 524, an upper surface 525, and a lower surface 526. The wall 520 can include an annular ramp portion 527 (See FIG. 5F) and an annular level portion 528. The ramp portion 527 extends radially inward (and downward) from the wall's outer edge 521, and the level portion 528 extends radially inward (and horizontal) from the ramp portion 527 to the inner edge 523. Referring now to FIG. 5J, the capillary ribs 530 are circumferentially arranged around the side wall 510. The can 500 can include at least two, at least four, at least six, and/or at least eight capillary ribs 530, and they can be spaced equally (or unequally) around the wall circumference. Each rib 530 has a ceiling 531, a floor 533, an interior surface 535, and an exterior surface 536. The ceilings 531 transition into the upper axial edge 511 of the cylindrical side wall 510, and the floors 533 transition into the lower axial edge 513 of the cylindrical side wall 510. The rib ceilings 531 are narrower than their floors 533, whereby they taper radially outward in the downward direction. The exterior surfaces 536 can curve inward to form semi-circular (in cross-section) grooves 537, whereby the ribs 530 can have substantially the same thickness as the side wall 510. The semi-circular grooves 537 also provide channels for water drainage and clean gas flow.

In the filter assembly 100 and/or the filter cartridge 300, the capillary ribs 530 are intended to act as guides and/or slides to encourage the downward flow of oil droplets from the media outer surface wall 415. To this end, the interior surfaces 535 project radially inward from the interior surface 515 of the cylindrical side wall 510, to thereby contact the filter media 410. The ribs' interior surfaces 535 are preferably smooth so as to be a path of lesser resistance for the oil droplets (e.g., when compared to the fibrous terrain of the filter media 410). The ribs 530 can be radially sized so that at an intermediate can height (e.g., between the ceiling and floor) the ribs' interior surfaces 535 contact the exterior surface 415 of the filter media 410. (See FIG. 2F.)

As an oil droplet scoots down the exterior surface 415 of the filter media 410, it passes through the open top end 512 of the can 500. When it reaches a rib-contacting region, it transfers onto the rib's smooth interior surface 535. Once on this smooth surface, it easily slides down to the rib's floor 533, through the slots 452/467 in the bottom end cap 450 and collecting can 500 respectively (See 4E-4H), onto the ramped wall portion 520 and thereafter down the outlet pipe 550 (See 5B).

The pedestals 540 are arranged on the upper surface 525 of the bottom wall 520. The oil-collecting can 500 can include at least two, and/or at least four pedestals 540. Each pedestal 540 includes a rectangular skirt 542 projecting upwardly from the wall 520, a horizontal platform 544 on top of the skirt 542, an interior surface 545, and exterior surface 546. The exterior surface 546 may include an indent 547 corresponding to the skirt 542, whereby the pedestals 540 can have substantially the same thickness as the bottom wall 520 (See FIG. 5E).

Figure 3E:
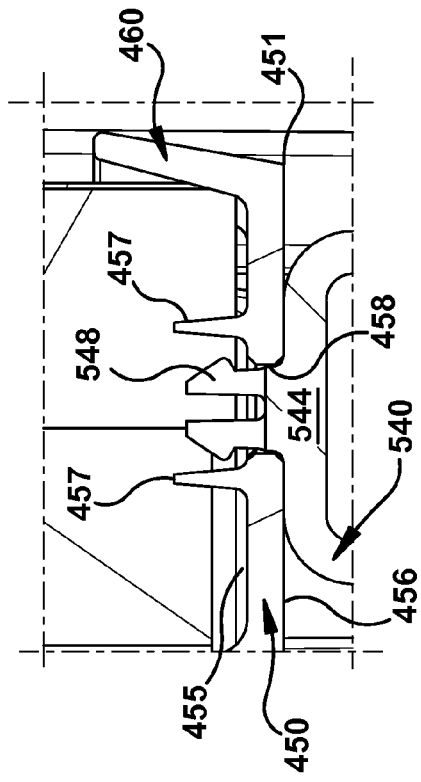
Figure 3C:
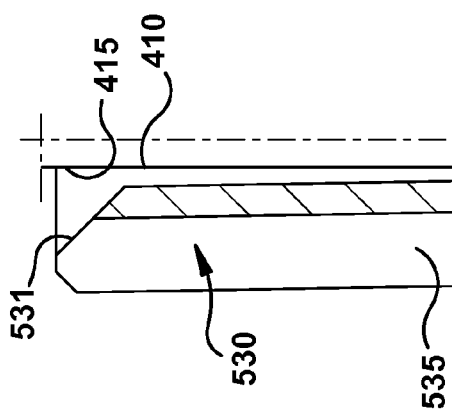

A cross-shaped clip 548 is situated on each platform 544. In the filter cartridge 300, these clips 548 are received within the holes 458 in the bottom end cap 450. (See FIG. 3E.) In the illustrated cartridge 300, the end cap 450 has eight holes 458 for the four pedestals 540, to allow more alignment flexibility during fabrication. In the final cartridge 300, the "extra" holes 458 are filled with adhesive.

Figure 5I:
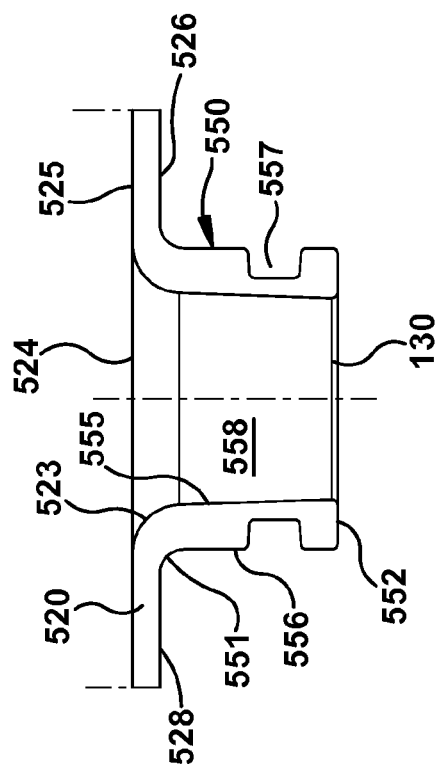

Referring now to FIG. 5I, the oil-outlet pipe 550 comprises a cylindrical wall 558 extending downward from the inner radial edge of the level portion 528 of the bottom wall 520 (and thus communicating with the opening 524). The pipe 550 and/or the wall 558 can include a seal-seating groove 557. In the filter assembly 100, the pipe 550 (and the seal seated within the groove 557) is inserted into the oil spout 240 of the housing 200. (See FIG. 2G.) Although the engine 10, the ventilation system 20, the filter assembly 100, the housing 200, the cartridge 300, the filter element 400, and/or the oil-collecting can 500 have been shown and described with respect to certain embodiments, equivalent alterations and modifications should occur to others skilled in the art upon review of this specification and drawings. If an element (e.g., component, assembly, system, device, composition, method, process, step, means, etc.), has been described as performing a particular function or functions, this element corresponds to any functional equivalent (i.e., any element performing the same or equivalent function) thereof, regardless of whether it is structurally equivalent thereto. And while a particular feature may have been described with respect to less than all of the embodiments, such feature can be combined with one or more other features of the other embodiments.

The invention claimed is:

1. An oil-collecting can for a filter cartridge, comprising:
    a cylindrical side wall having an upper axial edge defining an open top, a lower axial edge, an interior surface and an exterior surface;
    a bottom wall having a radially-outer edge that transitions from the lower edge of the side wall, a radially-inner edge that defines an opening, an upper surface, and lower surface;
    a plurality of capillary ribs circumferentially arranged around the side wall, the ribs each having a ceiling transitioning into the upper axial edge of the cylindrical side wall, a floor transitioning into the lower axial edge of the cylindrical side wall, a capillary rib interior surface projecting radially inward from the interior surface of the cylindrical side wall, and a capillary rib exterior surface;
    a set of pedestals arranged on the upper surface of the bottom wall, each pedestal including a top platform and a skirt extending upward from the bottom wall and elevating the platform above; and
    an outlet pipe having an upper axial edge transitioning from the radially-inner edge of the bottom wall, a lower axial edge defining an oil-outlet port, an interior surface and exterior surface.

2. An oil-collecting can as set forth in claim 1, wherein the cylindrical side wall, the bottom wall, the capillary ribs, the pedestals, and the outlet pipe are formed in one piece.

3. An oil-collecting can as set forth in claim 1, wherein the ribs' ceilings are narrower than their floors, and they taper radially inward in the downward direction.

4. An oil-collecting can as set in claim 1, wherein the exterior surface of the ribs form semi-circular grooves.

5. An oil-collecting can as set forth in claim 1, including at least four capillary ribs.

6. An oil-collecting can as set forth in claim 1, wherein the exterior surface of the outlet pipe includes a seal-receiving groove.

7. An oil-collecting can as set forth in claim 1, wherein the cylindrical side wall comprises nubs extending radially outward from its upper edge.

8. An oil-collecting can as set forth in claim 1, wherein each pedestal includes a clip situated on its top platform.

9. An oil-collecting can as set forth in claim 1, wherein the exterior surface of each pedestal includes an indentation corresponding to its platform and its skirt whereby the thickness of the pedestals can be substantially the same as the thickness of the bottom wall.

10. An oil-collecting can as set forth in claim 1, including at least four capillary ribs,
    wherein the cylindrical side wall, the bottom wall, the capillary ribs, the pedestals, and the outlet pipe are formed in one piece;
    wherein the ribs' ceilings are narrower than their floors, and they taper radially inward in the downward direction; and
    wherein the exterior surface of the ribs form semi-circular grooves.

11. An oil-collecting can as set forth in claim 10, including at least six capillary ribs.

12. An oil-collecting can as set forth in claim 10, including at least eight capillary ribs.

13. An oil-collecting can as set forth in claim 1, wherein the exterior surface of the outlet pipe includes a seal-receiving groove;
    wherein the cylindrical side wall comprises nubs extending radially outward from its upper edge;
    wherein each pedestal includes a clip situated on its top platform; and
    wherein the exterior surface of each pedestal includes an indentation corresponding to its platform and its skirt whereby the thickness of the pedestals can be substantially the same as the thickness of the bottom wall.

14. An oil-collecting can as set forth in claim 13, including at least four capillary ribs,
    wherein the cylindrical side wall, the bottom wall, the capillary ribs, the pedestals, and the outlet pipe are formed in one piece;
    wherein the ribs' ceilings are narrower than their floors, and they taper radially inward in the downward direction; and wherein the exterior surface of the ribs form semi-circular grooves.

15. A filter cartridge comprising a filter element and the oil-collecting can set forth in claim 1;
   wherein the filter element includes filter media having an upper axial face, a lower axial face, an exterior surface, and an interior surface defining a central core;
   wherein the filter element further includes a top end cap sealing the upper axial face of the filter media and a bottom end cap sealing the lower axial face of the filter media;
   wherein a bottom portion of the filter element is positioned within the oil-collecting can and wherein an upper portion of the filter element projects thereabove;
   wherein the bottom end cap sits upon the pedestals to thereby elevate the filter element above the bottom wall of the oil-collecting can;
   wherein the capillary ribs contact the exterior surface of the filter media.

16. A filter cartridge as set forth in claim 15, wherein the bottom end cap includes slots that align with the capillary ribs in the oil-collecting can.

17. A filter cartridge as set forth in claim 15, wherein the filter element includes a top rim with external threads.

18. A filter cartridge as set forth in claim 15, wherein clips on the pedestals of the oil-collecting can extend through openings in the bottom end cap of the filter element;
   wherein the bottom end cap includes slots that align with the capillary ribs in the oil-collecting can;
   wherein the filter element includes a top rim with external threads; and
   wherein clips on the pedestals of the oil-collecting can extend through openings in the bottom end cap of the filter element.

19. A filter assembly comprising a housing and the filter cartridge set forth in claim 15, the housing comprising a cylindrical wall surrounding the exterior surface of the filter element, a bottom wall positioned below the bottom wall of the oil-collecting can.

20. A crankshaft ventilation system for a combustion engine comprising the filter assembly set forth in claim 19, wherein an engine vent line is connected to an inlet port of the filter assembly.

* * * * *